United States Patent [19]
Tompkins et al.

[11] Patent Number: 5,616,354
[45] Date of Patent: Apr. 1, 1997

[54] METHOD FOR PROCESSING FRESH STRAWBERRIES FOR EXTENDED SHELF LIFE

[76] Inventors: Nicholas J. Tompkins, 193 Oak Grove La.; Tim T. Murphy, 1560 Ewing Ave., both of Arroyo Grande, Calif. 93420; Andrew T. Furukawa, 1213 Cobblestone La., Santa Maria, Calif. 93454

[21] Appl. No.: 542,415

[22] Filed: Oct. 12, 1995

[51] Int. Cl.⁶ .................................................. A23B 7/00
[52] U.S. Cl. ................ 426/324; 426/326; 426/396; 426/615
[58] Field of Search ........................ 426/615, 324, 426/326, 396, 518, 524, 106

[56] References Cited

U.S. PATENT DOCUMENTS

| | | | |
|---|---|---|---|
| 4,553,373 | 11/1985 | Viitanen et al. | |
| 4,734,324 | 3/1988 | Hill | 428/317.3 |
| 4,751,094 | 6/1988 | Orr et al. | 426/481 |
| 4,769,262 | 9/1988 | Ferrar et al. | 426/106 |
| 4,830,863 | 5/1989 | Jones | 426/396 |
| 4,879,078 | 11/1989 | Antoon, Jr. | 264/41 |
| 4,895,729 | 1/1990 | Powrie et al. | 426/316 |
| 4,910,032 | 3/1990 | Antoon, Jr. | 426/118 |
| 4,923,703 | 5/1990 | Antoon, Jr. | 426/118 |
| 4,956,209 | 9/1990 | Isaka et al. | 428/35.2 |
| 5,011,698 | 4/1991 | Antoon, Jr. et al. | 426/395 |

*Primary Examiner*—George Yeung
*Attorney, Agent, or Firm*—Lynn & Lynn

[57] ABSTRACT

A method for processing a fruit product such as fresh strawberries provides greatly prolonged shelf life by cooling the strawberries, washing the strawberries in a first chilled chlorine bath, slicing the strawberries to provide sliced strawberries, washing the sliced strawberries in a second chilled chlorine bath, draining the sliced strawberries to remove moisture therefrom, washing the sliced strawberries in a bath that comprises a citric acid and tribasic calcium solution, drying the sliced berries with de-humidified air, placing a selected weight of the strawberries into each one of a plurality of gas-impermeable containers, and sealing the containers with a breathable film.

10 Claims, 1 Drawing Sheet

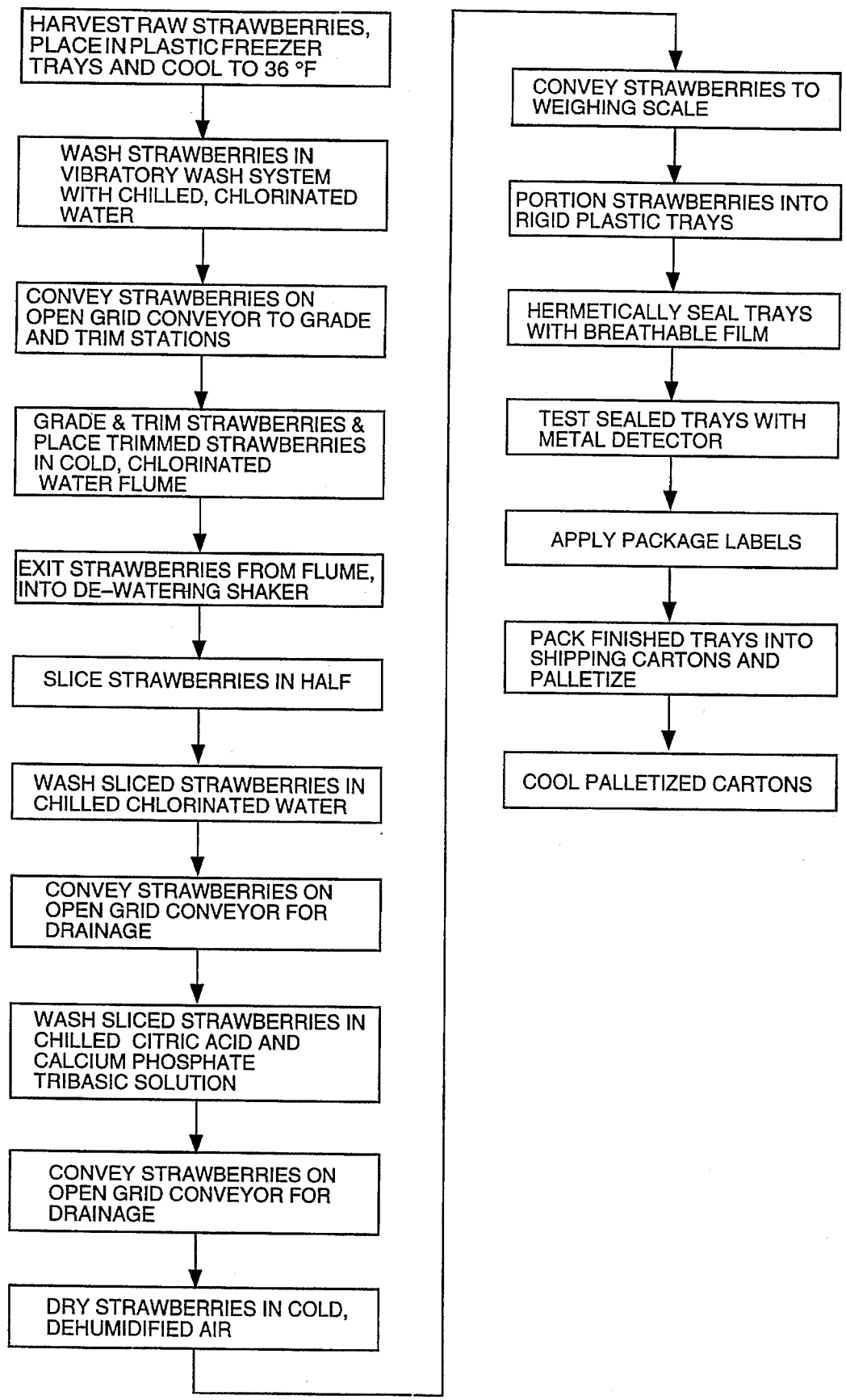

METHOD FOR PROCESSING FRESH STRAWBERRIES FOR EXTENDED SHELF LIFE

BACKGROUND OF THE INVENTION

This invention relates to methods for preparing and preserving fresh, ripe, edible fruit pieces such as strawberries so that the fruit may be stored for long periods of time without appreciable loss of natural flavor, color and texture. More particularly, the method pertains to the cutting and/or segmenting of fresh edible strawberry tissue into pieces, packing the strawberry pieces in a container, sealing the container, re-cooling the sealed containers, and storing the container at refrigerated temperatures.

It is well-known that the quality of whole picked or cut fresh fruit deteriorates rapidly at ambient temperatures. The deterioration rate can be slowed, thereby enabling the fruit to be retained for longer shelf-life, when the fruit is maintained at refrigerated storage temperatures. In most cases, the shelf-life of fresh, ripe whole fruit at refrigerated temperatures of 1° C. to 13° C. ranges from about three days to six weeks, depending in part on fruit type. Many fruits are picked and packed in the unripe stage in order to lengthen their shelf-life at both ambient and refrigerated temperatures. Unfortunately, with this practice, the fruit frequently lacks or fails to develop optimum ripe-fruit flavor, texture and color. Fruits harvested at the peak of ripeness possess high quality attributes that are strongly desired by consumers.

Thus, the development or discovery of a method to capture and retain the high quality attributes of ripe fruits for prolonged storage periods would be extremely advantageous. If all whole picked ripe fruits could be treated as one and stored under refrigeration without regard to any specific temperature requirement, then the storability and distribution of the fruits would be simple. Many types of fruits could, for example, be held in one constant temperature refrigerated room, or could be transported in one refrigerated truck at a common refrigeration temperature.

However, the situation is not that simple. Each species of whole fresh fruit must be stored within a specific custom temperature range so that acceptable quality for that particular fruit type can be retained.

In addition to a temperature factor, the composition of gases in the storage atmosphere enveloping the fruit can influence and prolong the storage life of whole fresh fruits. In particular, a moderately high level of carbon dioxide (2% to 10%) and reduced levels of oxygen (2% to 16%) in controlled atmosphere storage can significantly increase the shelf life of certain fruits such as apples, pears, strawberries and bananas. There is evidence that higher carbon dioxide levels and lower oxygen levels advantageously lower the respiration and ripening rates of the whole fruit. On the negative side, however, undesirable physiological disorders and deterioration in quality of the fruit may occur. In particular, strong off-flavor in the fruits may develop.

Modified atmosphere packaging is the term commonly used for the storage of food in a flexible or semi-flexible bag or pouch with an internal atmosphere which is not controlled but may indeed vary in composition during storage of the commodity due to gas transmission through the walls of the bag or pouch. Plastic films have been used to cover whole fruits in containers so that the atmosphere enveloping the fruit can be modified. Polyethylene box liners, either sealed or unsealed, have been employed commercially for some time for the storage and transportation of apples and pears. It has been found that the respiration of the whole fruit in a sealed, air containing, polyethylene bag will cause a rise in carbon dioxide level and a corresponding reduction in oxygen content in the bag interior. High levels of carbon dioxide (5% or higher) have been found to be harmful because they can cause unsightly fruit discoloration and "off-flavor" development. This is due to carbon dioxide toxicity. To reduce the risk of carbon dioxide toxicity to the whole fruit, the bags are either unsealed or perforated to permit atmosphere exchange, or packets of fresh hydrated lime, which reacts with the carbon dioxide to reduce its level, are placed in the bag prior to sealing.

Prior methods for modified atmosphere packaging of fruit and patents granted have conventionally focused on whole, uncut commodities. In general, these techniques are concerned with the maintenance of a suitable oxygen-containing environment around the exterior of whole fruits in plastic film packages. These techniques require that aerobic conditions be maintained in the atmosphere enveloping the whole fruit in order to prevent the development of anaerobic or fermentation "off-flavor" in the fruit. Yet at the same time, the atmosphere must contain a sufficient amount of carbon dioxide and/or nitrogen to inhibit fruit deterioration. The prior art also discloses removal of some of the ethylene and carbon dioxide in the surrounding atmosphere by the inclusion of an adsorption packet of chemicals in the package prior to sealing.

The prior art has focused on the $O_2/CO_2$ gas flushing of the packages containing whole strawberries. It has been determined that with this process, the storage life of this fruit can be lengthened by up to eight days. Still, the inability to store fresh ripe fruits for longer periods means that a considerable amount of fresh fruit is preserved by energy intensive, costly canning and freezing procedures.

SUMMARY OF THE INVENTION

The present invention is directed to a method for processing a fruit product such as fresh strawberries that provides greatly prolonged shelf life than previously known methods. Strawberries processed according to the present invention have exhibited shelf lives of up to three weeks.

The method according to the invention includes the steps of: (a) cooling the strawberries to a temperature of about 34° F.; (b) washing the strawberries in a first chilled chlorine bath; (c) slicing the strawberries to provide sliced strawberries; (d) washing the sliced strawberries in a second chilled chlorine bath; (e) draining the sliced strawberries to remove moisture so as to avoid cross contamination; (f) washing the sliced strawberries in a bath that comprises a citric acid and tribasic calcium solution; (g) drying the sliced berries with de-humidified air; (h) placing a selected weight of the strawberries into each one of a plurality of gas-impermeable containers; and (i) sealing the containers with a breathable film.

The method according to the invention may further include the step the of applying forced air cooling to the strawberries.

The method according to the invention may further be accomplished with step (b) including the steps of: forming the first chilled chlorine bath to have a chlorine concentration of approximately 100 parts per million; maintaining the first chilled chlorine bath to have a pH of approximately 5; maintaining the first chilled chlorine bath at a temperature of approximately 34° F. to 36° F.; and washing each strawberry for a dwell time of at least thirty seconds.

The method of the invention may also include the steps of: grading and trimming each strawberry to remove the calyx therefrom; providing a flume system containing a third chilled chlorine bath having a temperature of about 34° F. and a chlorine concentration of about 100 parts per million; and using the flume system to carry the strawberries to a de-watering shaker.

The method according to the invention may further be accomplished with step (d) including the steps of: forming the second chilled bath to have a chlorine concentration of approximately 100 parts per million; and maintaining the second chilled bath at a temperature of approximately 34° F. and washing each strawberry for a dwell time of at least one minute.

The method of the invention may still further include the step of slicing each strawberry in half.

The method according to the invention may further be accomplished with step (f) including the steps of: maintaining the citric acid and tribasic calcium solution at a pH between 5.0 and 6.0; and maintaining the citric acid and tribasic calcium solution at a temperature between f 33° F. and 36° F.; and washing each strawberry for a dwell time of at least one minute.

The method according to the invention may further be accomplished with step (g) including the steps of maintaining the dehumidified air at a temperature in the range of 28° F. to 30° F.

The method according to the invention may additionally include the steps of: testing the sealed trays with a metal detector; packaging the trays into shipping cartons and palletizing the shipping cartons; and forcing cool air into the palletized cartons to enhance the equilibrium process of the modified atmosphere package.

BRIEF DESCRIPTION OF THE DRAWINGS

The drawing is a flow chart of the method according to the invention.

DESCRIPTION OF THE PREFERRED EMBODIMENT

Referring to the drawing, the steps of the process according to the invention are shown. Raw strawberry product is harvested according to U.S. Department of Agriculture Grade 1 standards. The strawberries are harvested in plastic freezer trays rather than the conventional corrugated box and plastic baskets. Placing the harvested berries in plastic freezer trays reduces harvesting cost as the plastic freezer tray can be used repetitively. Once the strawberries are harvested, they are then cooled to approximately 36° F. This cooling preferably is accomplished with a forced air cooling system. Once the raw product is cooled, it should be maintained under constant refrigeration.

The second step of the process involves washing the cooled raw product in a vibratory wash system. This type of wash system utilizes chilled chlorinated water of approximately 34° F. that is constantly re-circulated and filtered to remove debris. Each plastic freezer tray of berries is emptied into a wash trough, and through the use of rapid vibratory movements the product exists the wash trough. The dwell time of the strawberries in the wash trough should be at least 30 seconds. The wash water is also chlorinated at 100 parts per million for bacteria control. Water pH should be maintained at a level of about 5.0. Water chlorination and pH are constantly monitored to so that if they cannot be controlled, the water may be drained and replaced.

In the third step, the strawberries exit the initial bath and move onto an open grid conveyor to be transported to a grade and trim station. The use of the open grid conveyor will allow any excess water to drain from the strawberries.

Referring to the fourth step of the illustrated process, each strawberry is graded and trimmed at the trim station. Berries showing signs of bruising, botrytis and those that are excessive green or misshapen will be discarded; or the undesired portion may be removed. Each berry is then graded. For those berries that are acceptable, individuals working at the trim station will remove the calyx by making an incision with a knife. The trimmed berries are then placed in a cold water flume system that runs parallel with the trim line. The water contained in the flume system is chilled to about 34° F. for continued cooling. The flume water is chlorinated at 100 ppm for bacteria control in the product.

The whole, capped strawberries exit the flume system and enter into a de-watering shaker. After passing through the de-watering shaker, the berries then enter into a halver apparatus. The strawberries are then cut in half from in the direction of where the calyx was to the point 180° opposite from the calyx location.

Continuing with the process, the strawberries halves are again washed in water that is chilled to a temperature of 34° F. and chlorinated at a concentration of about 100 ppm. The water pH should be maintained at approximately 5. Dwell time should be a minimum of one minute with complete submersion of each strawberry half for effective bacteria control and continued cooling of the finished product.

The process then involves removing the strawberry halves from the bath via a conveyor. The conveyor preferably is an open grid conveyor to provide for drainage of liquid form the fruit.

The sliced product is then washed in a chilled citric acid and calcium phosphate tribasic solution. The bath should have a temperature of be approximately 34° F. The bath should have a pH that is maintained at 5.0 to 6. Dwell time should be a minimum of one minute with complete submersion to ensure proper coverage to prevent enzymatic browning of the fruit. The coldness of the solution ensures continued cooling of the product.

The product is then conveyed and drained via an open grid conveyor belt. The product is dried utilizing cold de-humidified air. The air temperature preferably is approximately 33° F. The relative humidity of the drying air is preferably approximately 25% to 50%. Approximately 75% of the surface moisture should be removed from the strawberries. Some surface moisture should be retained to prevent product dehydration on the cut areas. At this point of the process, the finished product should have a core temperature that does not exceed 36° F. to minimize bruising during the final packaging process.

After drying, the strawberries are conveyed to a scale where the product is weighed so that it may then be portioned by weight into rigid plastic trays. After the product is placed in the plastic trays, the trays are sealed with a breathable film. Suitable breathable films for this purpose are well-known in the art.

The sealed trays are then individually tested by a metal detector to ensure that no pieces of metal are mixed with the product. Packaging labels are applied to provide nutritional information and the UPC code. The finished trays are packed into shipping cartons and palletized for shipping. The palletized product is force air cooled for 6 to 8 hours to enhance the equilibrium process of the modified atmosphere package.

While the present invention has been depicted and described by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. Accordingly, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A method for processing raw, fresh strawberries, comprising the steps of:
   (a). cooling the strawberries to a temperature of about 34° F.;
   (b). washing the strawberries in a first chilled chlorine bath;
   (c). slicing the strawberries to provide sliced strawberries;
   (d). washing the sliced strawberries in a second chilled chlorine bath;
   (e). draining the sliced strawberries to remove moisture therefrom;
   (f). washing the sliced strawberries in a bath that comprises a citric acid and tribasic calcium solution;
   (g). drying the sliced berries with de-humidified air;
   (h). placing a selected weight of the strawberries into each one of a plurality of gas-impermeable containers; and
   (i). sealing the containers with a breathable film.

2. The method of claim 1, wherein step (a) includes the step of applying forced air to the strawberries to provide cooling air thereto.

3. The method of claim 1, wherein step (b) includes the steps of:
   (b1) forming the first chilled chlorine bath to have a chlorine concentration of approximately 100 parts per million;
   (b2) maintaining the first chilled chlorine bath to have a pH of approximately 5;
   (b3) maintaining the first chilled chlorine bath at a temperature ranging between 33° F. and 36° F.; and
   (b4) washing each strawberry for a dwell time of at least thirty seconds.

4. The method of claim 1 including the steps of:
   (j) grading and trimming each strawberry to remove the calyx therefrom;
   (k) providing a flume system containing a third chilled chlorine bath having a temperature of about 34° F. and a chlorine concentration of about 100 parts per million; and
   (l) using the flume system to carry the strawberries to a de-watering shaker.

5. The method of claim 1, wherein step (c) includes the step of slicing each strawberry in half.

6. The method of claim 1, wherein step (d) includes the steps of:
   (d1) forming the second chilled bath to have a chlorine concentration of approximately 100 parts per million; and
   (d2) maintaining the second chilled bath at a temperature of approximately 34° F.

7. The method of claim 1, wherein step (f) includes the steps of:
   (f1) maintaining the citric acid and tribasic calcium solution at a pH between 5.0 and 6.0; and
   (f2) maintaining the citric acid and tribasic calcium solution at a temperature between 33° F. and 36° F.; and
   (f3) washing each strawberry for a dwell time of at least one minute.

8. The method of claim 1, wherein step (g) includes the step of maintaining the dehumidified air at a temperature in the range of 28° F. to 30° F.

9. The method of claim 1, further including the steps of:
   (m). testing the sealed containers with a metal detector;
   (n) packaging the containers into shipping cartons and palletizing the shipping cartons; and
   (o). forcing cool air into the palletized cartons to temperature-stabilize the packages to enhance the equilibrium process of the modified atmosphere package.

10. A method for processing raw, fresh strawberries, comprising the steps of:
    (a). cooling the strawberries with a forced air cooler to a temperature of approximately 34° F.;
    (b). washing the strawberries with a vibratory wash system in a first chlorine bath having a pH of 5, a chlorine concentration of 100 parts per million and a temperature of between 33° F. and 36° F. for at least thirty seconds;
    (c). draining the strawberries and conveying them to a trim station;
    (d) washing the strawberries in a second chlorine bath having a pH of 5 and a temperature of 34° F.;
    (d). grading and removing the calyx from each of the strawberries;
    (e). cutting the strawberries in half to produce sliced strawberries;
    (f). conveying the sliced strawberries to a washing bath;
    (g). washing sliced strawberries in a third chlorine bath having a pH of 5, a chlorine concentration of 100 parts per million and a temperature of 34° F. for at least one minute;
    (h). draining the sliced strawberries to remove moisture therefrom;
    (i). washing the sliced strawberries in a bath that comprises a bath of citric acid and tribasic calcium chilled to a temperature of 33° F. to 36° F.;
    (j). draining the strawberries on a conveyor;
    (k). drying the sliced berries with de-humidified air that has a temperature in the range of 28° F. to 30° F.;
    (l). conveying the strawberries to a weighing scale;
    (m). placing a selected weight of strawberries into each one of a plurality of rigid plastic trays;
    (n). sealing the trays hermetically
    (o). packaging the trays into shipping cartons and palletizing the shipping cartons; and
    (p). forcing cool air into the palletized cartons to enhance the equilibrium process of the modified atmosphere package.

* * * * *